Feb. 3, 1970  J. JUGLER  3,493,457
CONTROL CIRCUIT FOR TOOL DRIVEN BY SONIC ENERGY
Filed Jan. 6, 1967  2 Sheets-Sheet 1
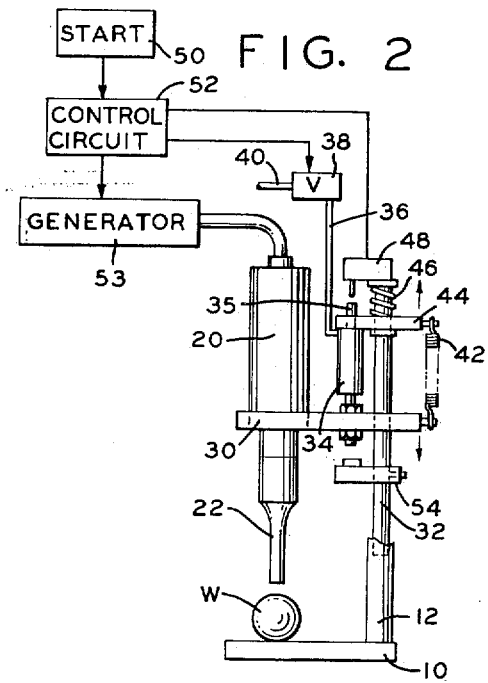
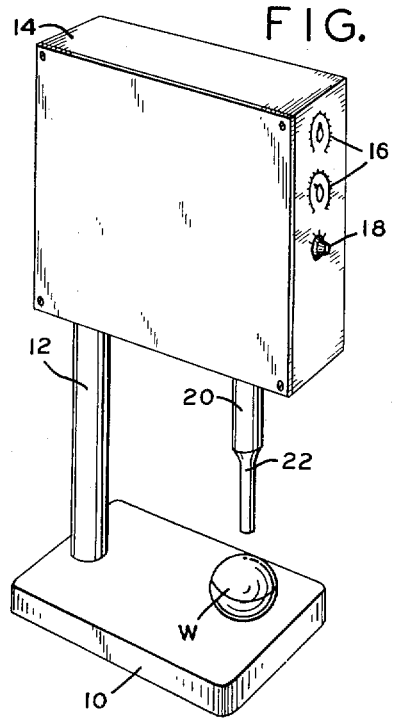
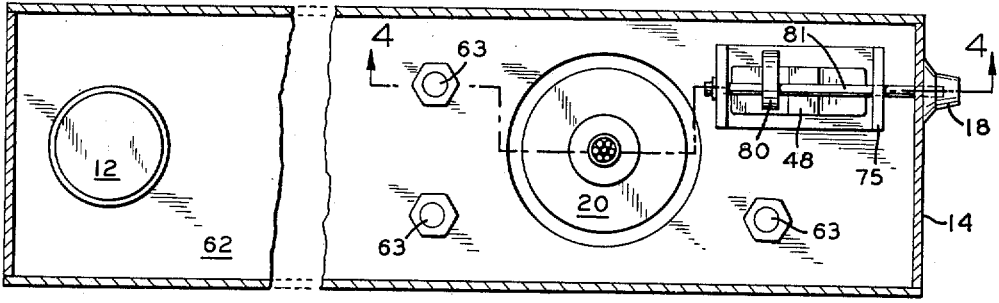
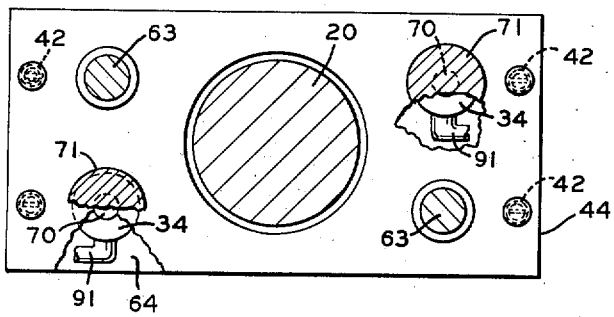
INVENTOR
JOHN JUGLER
BY
Erwin B. Steinberg

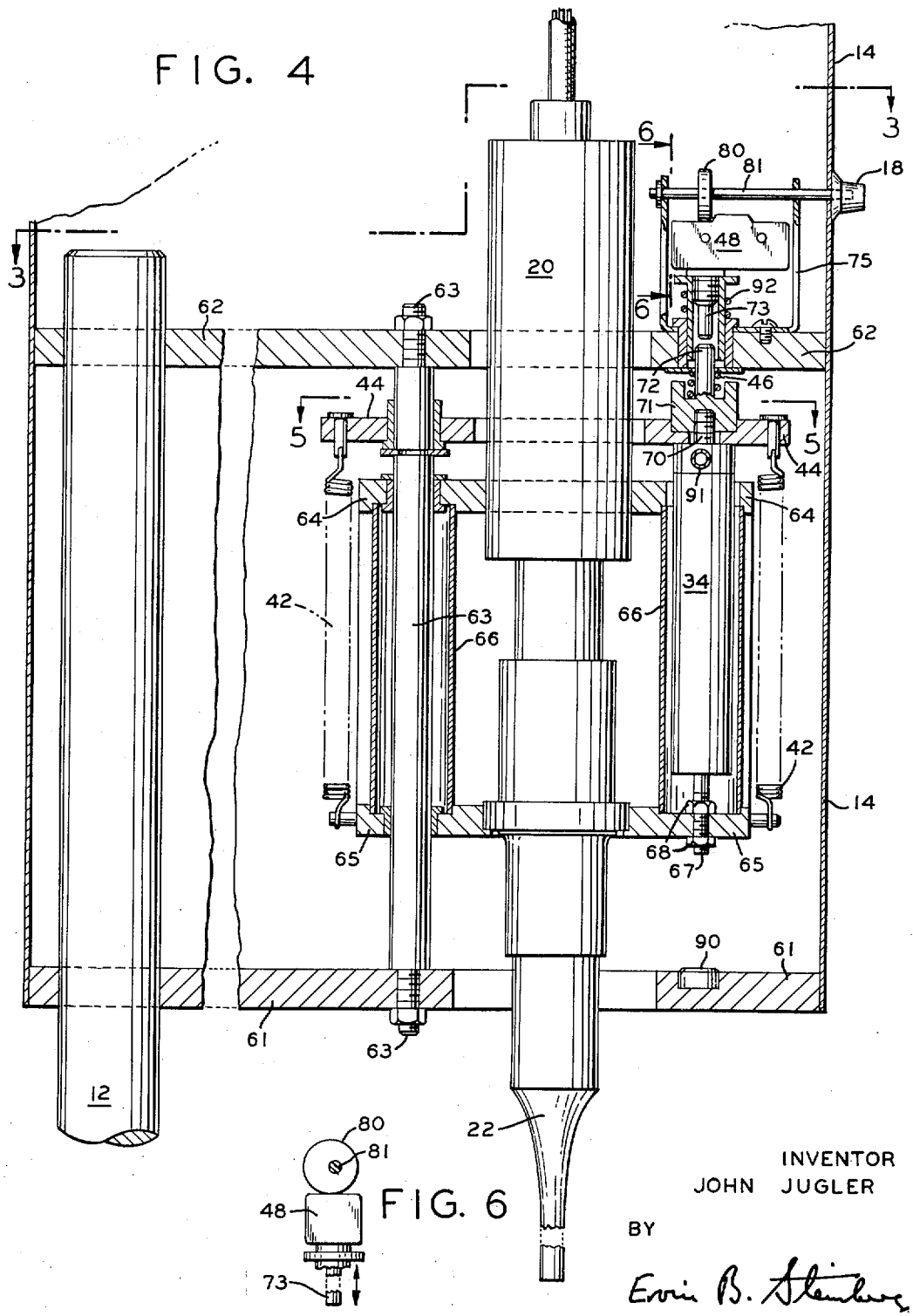

United States Patent Office 3,493,457
Patented Feb. 3, 1970

3,493,457
CONTROL CIRCUIT FOR TOOL DRIVEN BY
SONIC ENERGY
John Jugler, Danbury, Conn., assignor to Branson
Instruments, Incorporated, Stamford, Conn., a corporation of Delaware
Filed Jan. 6, 1967, Ser. No. 607,827
Int. Cl. B23k 1/06
U.S. Cl. 156—580        6 Claims

ABSTRACT OF THE DISCLOSURE

A tool adapted to transfer sonic energy to a workpiece is brought into forced engagement with the workpiece. Control means are disposed and connected to control the energization of the tool with sonic energy in response to the reaction of the engagement force between the tool and workpiece. The reaction, as shown, is a motional displacement of the motion producing means.

---

This invention broadly refers to a control circuit for a tool, and, more particularly, has reference to a control circuit for a tool which is driven by sonic energy and operates upon a workpiece.

Quite specifically, the present invention refers to a sonic welding apparatus and similar devices in which a tool is brought into engagement with a workpiece and, upon the existence of positive engagement therebetween, power means are energized to drive the tool which then transfers energy to the workpiece.

In recent years welding with sonic energy has found wide-spread application and is used for joining thermoplastic parts and metallic members. Generally, ultrasonic frequency in the range of 20 kilocycles per second is used to provide the energy which causes a weld. Apparatus of this type comprise essentially a converter which transforms electrical energy applied thereto to mechanical vibrations, using either magnetostrictive or electrostrictive transducing means, an acoustic horn mechanically coupled to the converter and serving as an output transformer, and an electrical generator providing alternating current at high frequency to the converter. A welding apparatus of this type is described for instance in the patent to Robert S. Soloff et al., U.S. Patent No. 3,224,916 issued on Dec. 21, 1965, entitled "Sonic Method of Welding Thermoplastic Parts."

While the converter and the output horn coupled thereto may be held in manual engagement with the parts to be welded, it has been found advantageous and convenient to automate the motion of the converter by mounting the converter on a stand and coupling the converter to a fluid controlled actuator. Thus, the pieces to be welded may be placed, for instance, on a rotary table or on a moving band for passage underneath a welding position, while the converter is moved cyclically in a reciprocating motion to alternately contact the workpiece for transferring energy thereto and subsequently to be lifted therefrom in order to permit the workpiece to leave the welding position. Even when manual feeding of workpieces to the welding position is accomplished, mounting the converter and horn to a power controlled motion means is preferred in order to free the hands of the operator for the handling of parts. Also, the engagement pressure applied between the tool and workpiece can be controlled much more accurately in power controlled motion arrangements than is possible in a manually held system.

In the application described hereinabove, the generator providing the electrical energy to the converter is started when the horn is in physical engagement with the workpiece. This condition is usually determined by an electrical limit switch which is positioned in relation to the workpiece in such a manner that the switch is actuated when the converter is moved by the actuator to a position which under nominal conditions is representative of physical engagement between the frontal surface of the horn and the workpiece. The electrical generator is then energized for a predetermined time interval, causing the converter to provide mechanical oscillations which, amplified by the horn, are transferred to the workpiece to cause welding.

Several shortcomings of this arrangement for actuating the generator are apparent. The limit switch must be set rather accurately for the travel distance of the converter in relation to the workpiece to be welded. Any variation in the physical size of the workpiece will affect the operation of the limit switch, that is, the switch may be actuated too early without physical contact between the workpiece and the horn having been established, or alternatively, the switch may fail to be operated despite the existence of physical contact between the horn and the workpiece. Moreover, the switch must be repositioned when workpieces having different physical dimensions are to be welded. The positioning of the switch itself requires a certain degree of skill and must be accomplished by trial and error, that is, using a quantity of workpieces in order to determine the normal variations which exist and those which are introduced by inaccurate feeding of the workpieces.

Moreover, the use of very short welding cycles on some parts, less than one second, requires that the power be started in a most precise manner, that is, only when proper physical contact between the horn and workpiece has been attained. In the absence of this condition either no weld is achieved or the workpiece is scarred and damaged because of insufficient contact.

It has been found that the above stated shortcomings may be eliminated by the use of a control means which is actuated in response to the reaction of a the engagement force between the horn and the workpiece. This control means, for instance, an electrical switch, is connected to the ultrasonic energy source for causing the transfer of acoustic energy. In this way, the sonic energy is applied only upon the existence of proper and sufficient contact between the acoustic horn and the workpiece. It will be apparent that this arrangement overcomes problems of mechanical tolerances in the workpiece or switch actuation, eliminates difficult mechanical alignment and setting of limit switches, and eliminates, moreover, operator judgment as to precise point when sonic energy application is to be started.

One of the principal objects of this invention is, therefore, the provision of a new and improved control circuit for a tool which is moved into and out of engagement with a workpiece.

Another important object of this invention is the provision of a control circuit for a sonically driven tool wherein the control circuit is responsive to the reaction of the engagement force between the tool and the workpiece.

Another important object of this invention is the provision of a control circuit for a tool driven by sonic energy, the tool being movable in response to fluid pressure and pressure responsive to the engagement between the tool and a workpiece producing a physical displacement which is used to cause actuation of an electrical circuit control means.

A further and other object of this invention is the provision of a control circuit for a tool adapted to be driven by sonic energy, the tool being movable in response to the operation of a fluid driven actuator, the engagement force between the tool and the workpiece causing a countermotion effective upon the actuator, whereby such motion actuates a circuit switch which controls the initiation of sonic energy.

Further and still other objects of this invention will be more clearly apparent by reference to the following description when taken in conjunction with the accompanying drawings, in which:

FIGURE 1 is a perspective illustration of a sonic device, particularly of a welding apparatus;

FIGURE 2 is a schematic illustration of the entire apparatus;

FIGURE 3 is a plan view along section line 3—3 in FIGURE 4;

FIGURE 4 is an elevational view, partly in section, showing the ultrasonic tool, the motion producing mechanism, and the control means disposed for actuation responsive to the reaction of the engagement force between the tool and workpiece;

FIGURE 5 is a view along section line 5—5 in FIGURE 4; and

FIGURE 6 is the view along line 6 in FIGURE 4.

Referring now to the figures and FIGURE 1 in particular, an ultrasonic welding apparatus is shown which is positioned for welding together two parts of a workpiece W. The apparatus illustrated comprises a platform 10 from which a standard 12 extends. The standard supports the ultrasonic tool, the motion producing mechanism, various control means and the like, all enclosed in a housing 14. At the front panel of the housing 14 there are provided two controls 16, one of the controls serves for adjusting the amount of time during which sonic energy is applied to the workpiece, and the other control serves for setting the dwell period, the duration of contact between the tool and the workpiece after the cessation of energy transfer. A further control knob 18 is provided whose function will be explained more clearly in connection with FIGURES 3 to 6.

The ultrasonic tool 20 is an electro-acoustic converter which includes either magnetostrictive or electrostrictive means for converting electrical high frequency energy applied thereto at mechanical oscillations at sonic frequency, usually 20 to 25 kilocycles per second. The electroacoustic converter 20 is fitted with an output horn 22 which amplifies the mechanical vibrations, as is well known to those skilled in the art.

In order to transfer sonic energy from the converter 20 and the horn 22 to the workpiece W so as to produce a weld, the converter 20 is mounted for reciprocating motion and can be brought into engagement with the workpiece W and then lifted therefrom in order that a new workpiece may be placed on the platform 10.

FIGURE 2 shows, in a schematic manner, the entire arrangement and the principle of the present invention. The converter 20 with horn 22 attached thereto is mounted in a motion plate 30 which is adapted to move along the vertical shaft 32, the latter being supported by the standard 12. The sonic tool, that is, the converter 20 and the horn 22, is moved toward and away from the workpiece W in response to the motion of a piston forming a part of the linear actuator 34. The piston is coupled to the plate 30. The linear actuator is a fluid driven device and receives fluid pressure via a line 36, a control valve 38, and a supply of fluid pressure (not shown) applied to the control valve 38 via a line 40. A spring 42 mounted between the motion plate 30 and a reaction plate 44 serves to provide a return force for returning the piston of the actuator, when extended, to its retracted position in the actuator cylinder. The reaction plate 44 which supports the cylinder of the linear actuator 34 is mounted for limited vertical motion along the shaft 32 against the force exerted by the spring 46 which is interposed between the plate 44 and a control means 48, typically a microswitch. Operation of this entire arrangement may be visualized as follows:

When the start switch 50 is operated, the control circuit 52 is actuated causing fluid, air or liquid, to enter the linear actuator 34 via the solenoid control valve 38. The fluid pressure between the cylinder and the piston causes the piston to advance downward carrying along the motion plate 30, thereby lowering the converter 20 and horn 22 upon the workpiece W. The engagement pressure between the horn 22 and the workpiece W creates a reaction which manifests itself on the cylinder of the actuator 34 and, since the cylinder is fastened to the plate 44 which is mounted for limited motional displacement, the plate 44 is driven in an upward direction against the force exerted by the spring 46, whereby the projection 35, fastened to the plate 44, causes actuation of the control switch 48. The switch, in turn, provides a signal to the control circuit 52, causing the generator 53 to provide for a predetermined period of time energy to the converter 20. After the power transfer and the dwell time has elapsed, the control circuit 52 causes the valve 38 to release the fluid pressure between the piston and the cylinder, thereby permitting the piston to retract in response to the force exerted by the spring 42, thereby breaking engagement between the horn 22 and the workpiece W, and simultaneously the plate 44 is lowered and returned to its normal position.

It will be apparent that the control switch 48 is actuated only in response to the reaction caused by the engagement pressure between the horn 22 and the workpiece W, thereby assuring that there is not only actual engagement, but also a sufficient force between the ultrasonic tool and the workpiece to assure acoustic coupling and proper energy transfer.

A lower stop means 54 disposed on the shaft 32 serves to limit the downward motion of the piston in the event that the start switch 50 is operated without a workpiece W being disposed on the platform 10.

The detailed construction of the arragement shown in FIGURE 2 is revealed more clearly in FIGURES 3 to 6. The standard 12, FIGURE 4, supports two stationary plates 61 and 62. The plates 61 and 62 are held to each other in spaced relation by a set of spacing bolts 63 and associated nuts, see also FIGURE 3. The ultrasonic converter 20 with horn 22 is mounted to two spaced plates 64 and 65, both plates being movable along the spacing bolts 63. Suitable bearing bushings are disposed between the plates 64 and 65 and the bolts 63. The plates 64 and 65 are held in spaced relation by a set of tubular spacers 66.

In order to provide motion of the horn 22 toward and away from the workpiece W there are provided two linear actuators 34, see FIGURES 4 and 5. The pistons of the actuators 34 are coupled to the movable plate 65 by means of respective extensions 67 and nuts 68. The cylinders of the actuator 34 are secured to the plate 44 which is mounted for limited vertical motion in an upward direction against the force exerted by the spring 46. A set of helical springs 42 is fastened by suitable pins shown between the plates 44 and 65 for returning the actuator pistons to the fully retracted position in the cylinder when the fluid pressure between the piston and the cylinder head has been released. Therefore, the tension springs 42 will act as a return force.

The cylinders of the linear actuators 34, as seen in FIGURE 4, are fastened to the plate 44 by means of a stud extension 70 which extends from the cylinder through an aperture in the plate 44 and an internally threaded bushing 71 which is tightened on the stud 70 and clamps the actuator 34 to the underside of the plate 44. The bushing 71 is provided with a stud extension 72 which reaches into an aperture provided within the stationary plate 62. The plate 44 and the cylinders of the actuators 34 are biased away from the stationary plate 62 by a respective spring 46. However, in response to the reaction of the engagement force between the horn 22 and the workpiece W the cylinders and plate 44 coupled thereto are urged into upward motion against the force exerted by the springs 46 and the stud extension 72 is caused to actuate the contact arm 73 of a control switch 48 which is mounted in a bracket 75 above one of the actuators 34. A helical compression spring 92 urges the switch 48 into its upward position, away from the stationary plate 62. In fact, the spring 92 provides engagement pressure between the switch 48 and an eccentric control cam 80 mounted upon a shaft 81 and controllable by the knob 18. By means of the cam 80 the clearance between the stud extension 72 and the switch arm 73 is adjustable so as to control the reaction force which causes actuation of the switch 48.

An insert 90 in the lower stationary plate 61 serves to limit the downward motion of the piston of the actuator 34 and, in response to such motion, causing actuation of the switch 48, thereby cycling the device and preventing damage to the hydraulic or pneumatic system in the absence of a workpiece. Numerals 91 refer to the fluid couplings attached to the actuators.

In operation, therefore, fluid pressure applied to the actuators 34 lowers the converter 20 and horn 22 onto the workpiece. Upon engagement between the horn and workpiece, the resulting buildup of pressure between the respective cylinders and pistons causes a reaction force which raises the cylinders and the reaction plate 44 attached thereto and mounted for limited vertical motion. Vertical motion of plate 44 raises the bushing 71 and extension 72 which upon a preset amount of travel actuates the arm 73 of control switch 48. Switch 48 controls through a sequencing control circuit 52 the high frequency generator 53 which provides electrical energy to the converter.

It will be apparent that instead of a hydraulically or pneumatically actuated device, an electromagnetic device can be substituted and, in a similar manner, the reaction of the engagement force between the tool and the workpiece be used to actuate the control circuit for initiating the transfer of sonic energy from the tool to the workpiece. In any event, the reaction of the engagement force between the horn and the workpiece causes a counterforce which produces a limited motion of the plate 44 toward the stationary switch 48 to operate the control circuit for initiating the transfer of sonic energy responsive to the existence of a sufficient engagement pressure between the horn frontal surface and the workpiece.

1. In an ultrasonic apparatus, the combination of:
 a stand supporting a fluid-operated linear actuator having a cylinder and a piston, the latter being movable responsive to fluid pressure in said cylinder;
 an electro-acoustic converter provided with an output horn, which is adapted to engage a workpiece for imparting ultrasonic vibrations thereto, supported by said stand;
 means coupling said converter to said piston for causing said horn to move responsive to fluid pressure in reciprocating motion toward and away from a workpiece;
 means enabling said cylinder to move a limited amount in a countermotion resulting from the reaction caused by the fluid pressure providing forced engagement between said horn and the workpiece, and
 a switching means adapted to cause energization of said converter with electrical energy for causing said converter to provide the ultrasonic vibrations disposed to be actuated by the countermotion of said cylinder.

2. In an ultrasonic apparatus as set forth in claim 1 and including resilient means for urging said cylinder away from said switching means, and said reaction and consequent countermotion overcoming the force exerted by said resilient means.

3. In an ultrasonic apparatus as set forth in claim 1, said switching means being positionable by cam means relative to said cylinder, whereby to adjust the amount of countermotion which said cylinder travels for causing actuation of said switching means.

4. A control circuit for a tool adapted to be driven by sonic energy, the combination of:
 a tool adapted to engage a workpiece and transfer sonic energy thereto while being retained in such engagement;
 a linear motion device coupled to cause said tool to move along a first direction into engagement with such workpiece and urge such engagement;
 an element coupled to said linear motion device and adapted to be displaced in a second direction opposite said first direction responsive to the reaction force effective on said linear motion device and resulting from the forced engagement between said tool and the workpiece, and
 a switch for controlling a sonic energy source driving said tool mounted for actuation by said element responsive to its displacement resulting from the reaction of the engagement force between said tool and the workpiece.

5. A control circuit for an ultrasonic apparatus comprising:
 an electro-acoustic converter provided with an output horn which is adapted to engage the surface of a workpiece for imparting ultrasonic energy thereto in response to the energization of said converter;
 a fluid responsive device comprising a cylinder and a piston disposed in said cylinder, said piston coupled to provide relative motion between said converted and a workpiece whereby to cause, responsive to fluid pressure, engagement between said horn and workpiece and an engagement force between said horn and workpiece;
 a control means for controlling the energization of said converter mounted in fixed position relative to said cylinder, and
 further means coupled to said cylinder for causing actuation of said control means in response to the reaction of the engagement force between said tool and workpiece, such reaction manifesting itself as a countermotion of said cylinder and attendant motion of said further means toward said control means.

6. In an ultrasonic apparatus, the combination of:
 a stand having a platform for supporting a workpiece thereon and a standard extending from said platform;
 a fluid-operated linear actuator having a cylinder and a piston, the latter being movable responsive to fluid pressure in said cylinder, supported by said standard;
 an electro-acoustic converter having an output horn for engaging a workpiece supported on said platform and for imparting ultrasonic vibrations to the workpiece;
 means coupling said converter to said piston for causing said converter and horn to move responsive to fluid pressure admitted to said cylinder in reciprocating motion toward and away from said platform and a workpiece supported thereon;
 means enabling said cylinder to move a limited amount in a countermotion resulting from the reaction caused by the fluid pressure providing forced engagement between said horn and the workpiece;
 a generator for energizing said converter with electrical energy, and
 a switching means disposed in fixed position relative to said cylinder and mounted to be operated mechanically responsive to the countermotion of said cylinder when said horn is in mechanical engagement with said workpiece, and said switching means being connected electrically to cause responsive to its mechanical operation actuation of said generator for causing said converter and horn to provide the ultrasonic vibrations to said workpiece.

References Cited

UNITED STATES PATENTS

| | | | |
|---|---|---|---|
| 3,052,281 | 9/1962 | Hilton | 156—580 |
| 3,222,239 | 12/1965 | Deans | 156—73 X |
| 3,230,124 | 1/1966 | Akers. | |

OTHER REFERENCES

"Designing Plastic Parts for Ultrasonic Assembly," by Don J. Kolb, reprint from machine design, Mar. 16, 1967, pp. 1–8.

ROBERT F. STAHL, Primary Examiner

U.S. Cl. X.R.

228—1